US009313560B2

(12) United States Patent
Bae et al.

(10) Patent No.: US 9,313,560 B2
(45) Date of Patent: Apr. 12, 2016

(54) SCALABLE ACQUISITION OF TELEMETRY DATA FROM INSTRUMENTED SYSTEMS ENITITIES OVER A WIRELESS NETWORK

(75) Inventors: Ju Hee Bae, Seoul (KR); Young Ju Tak, Seoul (KR); Christopher Hugh Howson, Sleepy Hollow, NY (US); Jonathan Munson, Putnam Valley, NY (US); Won Il Lee, Seoul (KR)

(73) Assignee: International Business Machines Corporation, Armonk, NY (US)

( * ) Notice: Subject to any disclaimer, the term of this patent is extended or adjusted under 35 U.S.C. 154(b) by 1478 days.

(21) Appl. No.: 12/487,999

(22) Filed: Jun. 19, 2009

(65) Prior Publication Data
US 2010/0321204 A1    Dec. 23, 2010

(51) Int. Cl.
*H04Q 9/00* (2006.01)
*G06F 17/30* (2006.01)

(52) U.S. Cl.
CPC ............ *H04Q 9/00* (2013.01); *G06F 17/30442* (2013.01); *G06F 17/30457* (2013.01); *G06F 17/30935* (2013.01); *H04Q 2209/10* (2013.01); *H04Q 2209/40* (2013.01); *H04Q 2209/82* (2013.01)

(58) Field of Classification Search
CPC . H04Q 9/00; H04Q 2209/00; H04Q 2209/10; H04Q 2209/20; H04Q 2209/40; H04Q 2209/80; H04Q 2209/84; G06F 17/30442; G06F 17/30448; G06F 17/30457; G06F 17/30929; G06F 17/30935; G06F 17/90938
USPC ............ 340/870.01–870.44, 870.02, 870.07; 707/769–780, 790–812, 713–719, 725; 709/201–203, 223–226; 700/7, 169, 700/28, 47, 48
See application file for complete search history.

(56) References Cited

U.S. PATENT DOCUMENTS

2009/0224941 A1* 9/2009 Kansal et al. ............ 340/870.06
2010/0318588 A1* 12/2010 Buford et al. ................ 707/955

OTHER PUBLICATIONS

Authors: Lukasz Golab, Kumar Gaurav and M. Tamer, Title: Multi-Query Optimization of Sliding Window Aggregates by Schedule Synchronization, pp. 1-22, Date: Aug. 2006.*
Merlin, et al., "Sensor Network Middleware for Managing c Cross-Layer Architecture", Proc. IEEE Conf. on Distributed Computing in Sensor Systems (DCOSS'06) Workshop on, Jun. 2006.
Heinzelman, et al., "Middleware to Support Sensor Network Applications", IEEE, Jan./Feb. 2004, vol. 18, Issue 1, pp. 6-14.

* cited by examiner

*Primary Examiner* — Hai Phan
*Assistant Examiner* — Franklin Balseca
(74) *Attorney, Agent, or Firm* — Scully, Scott, Murphy & Presser, P.C.; Daniel P. Morris, Esq.

(57) ABSTRACT

A telemetry data acquisition management system includes a system processor and an interface engine, controlled by the system processor, for interfacing with sensor bearing systems, to receive telemetry data from the sensor bearing systems, and distribute the data to a plurality data processing systems or applications operational for processing telemetry data according to each sensor bearing systems' protocol. The system processor enables the plurality of multiple data processing systems or applications to specify telemetry requests including "fuzzy" timeliness protocol, generates a charging structure such that the sensor bearing systems are charge by usage commensurate with system load.

20 Claims, 4 Drawing Sheets

SCALABLE ACQUISITION OF TELEMETRY DATA FROM INSTRUMENTED SYSTEMS ENITITIES OVER A WIRELESS NETWORK

BACKGROUND OF THE INVENTION

The present invention relates to a system and method that support the scalable acquisition of telemetry data from instrumented entities over a wireless network.

One of the roles of sensor network middleware is to acquire data from entities bearing sensors, and distribute the acquired sensor data to various applications that process the sensor data, according to the application requirements. Middleware is known to be deployed as a service, or to provide services accessible over the Internet by the applications. The middleware provides the various applications access to large numbers (e.g., millions) of sensor-bearing entities (e.g., cell phones, automobiles) over a wireless network. The middleware acts as a gate keeper (gateway) between the various applications and the sensor-bearing entities. This form of deployment is desirable because the middleware is accessible to any application having access to the Internet, and required permissions to access the middleware service(s). Deploying such known middleware service, however, is not without shortcomings.

In view of the fact that the middleware is deployed to provide access to large numbers of clients, and that the various applications can request frequent sensor readings for their particular purposes, the middleware must support (service) extremely high rates of data. Such very high data rates can overwhelm "off-the-shelf" application server technology and applications that are not designed for high or extremely throughput requirements. Because multiple applications may subscribe to data from the same client, the client may be overloaded in the absence of technology that helps it manage the subscriptions. Accordingly, wireless links between the clients and the middleware server may be overloaded, or cost the middleware provider significant amounts of money where data flow from clients to the middleware is not optimized. Consequently, applications are overloaded by the telemetry streams of large numbers of clients.

Efforts to increase efficiency in the middleware can decrease timeliness of data reaching the application, requiring effort to preserve an application's timeliness requirements under such circumstances. And while the field of sensor-network middleware is actively developing, with improved sensor network designs that address a wide range of known shortcomings in the art, no solutions that address this form of scalability challenge are not known.

Hence, there is a distinct need in the art for a system or method that operates to acquire telemetry data from instrumented entities that overcomes the shortcomings of the prior art.

SUMMARY OF THE INVENTION

To that end, the present invention enables applications to specify "fuzzy" timeliness specifications in their telemetry requests and creates a charging structure to charge providers according to the load they place on the network. The system combines subscriptions of multiple applications to same data items from same entities so that load on entities for sensor reading and the wireless network is reduced. Multiple subscription "optimizing" mechanisms (depending on the ability at the entity to optimize) are available including server only, entity only, server/entity combined. The system evaluates data-reading conditions on entities so that applications only receive sensor readings when the conditions have been met so that load on entities for sensor reading and the wireless network is reduced. The system pre-compiles the condition at the server to allow for a simpler condition evaluator at the entity, and spreads the overhead of processing a telemetry event over many events. A Client Telemetry Aggregator (system module) buffers the telemetry transmissions from clients for a short time and then forwards them to the Telemetry Receiver in a single bulk transaction, without violating the application's delay-tolerance specifications.

The system reduces the processing load of applications using group subscriptions, whereby sensor readings at entities in the groups are approximately synchronized so that the collection at the server is able to collect the data from larger numbers of entities than in the unsynchronized case, increasing the "density" of data sent to applications. The system efficiently support requests for one-time readings, including a caching mechanism that returns the requested data if it is read within a certain "freshness" period (to satisfy either a subscription or another one-time request), instead of making a costly request across the wireless network to the entity. The system also supports applications that require only data collection and not real-time data feeds, with an archiving mechanism and associated summarizing functions to distribute archiving functionality to the entities to reduce wireless network load. Entities perform as much archiving as possible, and forward partially archived results to the server for the final archiving.

No existing sensor-network middleware (SNM) provides these functions. Applications using other SNM solutions will have to provide these functions themselves, and, because many of these functions support the use of multiple applications, the application-provided solution will be non-optimal.

BRIEF DESCRIPTION OF THE DRAWING FIGURES

The foregoing and other objects, aspects and advantages will be better understood from the following detailed description of embodiments of the inventions, with reference to the drawings, in which.

DETAILED DESCRIPTION OF THE INVENTION

Overview

Figure 1:
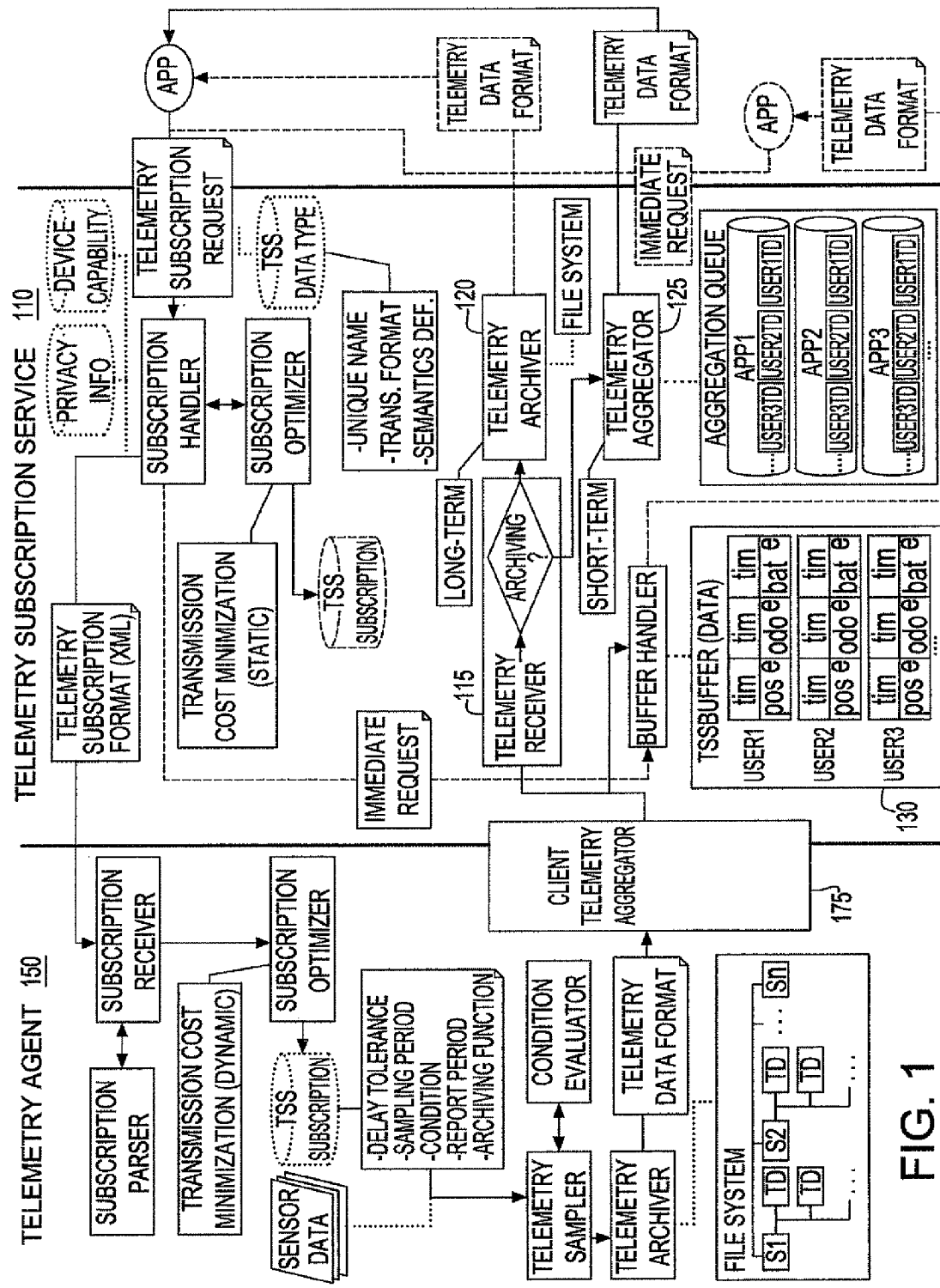
FIG. 1 is a system level diagram depicting a system for telemetry data acquisition of the invention.

The inventive system for telemetry data acquisition supports two main types of requests: requests for periodic delivery of telemetry data, and requests for one-time delivery of telemetry data. FIG. 1 is a functional description of the system, highlighting both types of telemetry data acquisition. The system flow of one-time requests is shown in dashed lines, where the system flow for processing requests for periodic delivery is shown in solid lines.

Subscription Requests (Periodic)

When a subscription for a client's telemetry data is received, the telemetry subscription service (TSS) 110 first analyzes the subscription with respect to other subscriptions for the same client application, with the goal of adjusting the subscriptions relative to each other in order to create an optimized set (See Section 2). The TSS 110 then sends the subscription to the client application, along with any updates required due to changes to other subscriptions.

At the client application, a Telemetry Agent 150 performs a different optimizing analysis in order to determine which subscriptions' sampling requirements can be merged. When a subscription is sampled, any condition expression associated with the subscription is evaluated, and if the condition expression returns: True, the sampled data is either archived, if there is an archiving specification in the subscription, or transmitted immediately to the Client Telemetry Aggregator 175.

The Client Telemetry Aggregator 175 receives telemetry data transmissions, as HTTP POSTs, and buffers the data transmissions for a short period before forwarding to a Telemetry Receiver 115. The purpose of the buffering is to spread the per-call overhead of the Telemetry Receiver over a large number of individual transmissions. The Telemetry Receiver either directs the data to a Telemetry Archiver 120, if it is an archiving subscription, or to a Telemetry Aggregator 125. The Telemetry Aggregator performs a function similar to that of the Client Telemetry Aggregator 175, but on a per-application basis. In this case, the aggregation is mainly for the benefit of the application, which will be able to process more telemetry events per call than without aggregation.

Group subscription requests are handled by first listing the users in the specified group and entering a single-user subscription for each user. One additional step involves creating a separate subscription record for the group subscription. This is described in more detail in the description for a TelemetrySubscriptionServiceImpl class's "reportTelemetryForGroup" method.

One-Time Requests

Requests for a one-time telemetry sampling of a client's data, or data of a group of clients, include a "freshness" parameter that specifies how old a cached data reading can be and remain acceptable to the application. The TSS 110 first checks a TSSBuffer 130 for the data. If the data is not found in the TSSBuffer, or if the data found is too old, the system sends a request to the client for the data. A subscription record is created for the request, including that a field indicating that the request is a one-time request is set to: True. When telemetry data for a one-time request arrives at the Telemetry Receiver 115, it is handled like data for subscription requests, with two exceptions. First, the subscription record is not cached because it will not be read again, and second, the record is deleted.

Subscription Optimization

In data-acquisition system such as described herein, the number of applications that may request a client's telemetry data at any one time is not limited. If each application's telemetry subscription were fulfilled independently of all the others, the client would possibly be overwhelmed with the task of fulfilling the subscriptions, and the cost of sending the data over the wireless network could be prohibitively expensive. The inventive system overcomes this shortcoming by including a "subscription optimization" mechanism or process, which process fulfills the set of subscriptions in a coordinated manner, so that the overall cost (or system loading) is substantially reduced. The invention includes three separate techniques or processes for subscription optimization.

Interval Range Matching

Each subscription includes two specifications for the desired interval between telemetry samples: 1) a minimum interval and 2) a maximum interval. The Interval Range Matching process creates groups of subscriptions such that for each group, the sampling range of each subscription (of the group) overlaps with all the other subscriptions in the group. Doing so enables the client to sample and transmit all the subscriptions in a group at the same time.

The server does not explicitly communicate the grouping to the client. Rather, the group in which a subscription belongs is indicated by an optInterval attribute in the "subscribe and update" elements in a telemetry request message. Clients maintain a subscription group for each distinct value of optInterval in the set of subscriptions they have received.

The interval range matching function or process is specified by a procedure addSubscription (invoked when an application subscribes to telemetry), and deleteSubscription (invoked when an application stops a subscription). For example, S is defined as a set of telemetry subscriptions for one client, wherein each s in S has a minimum sampling interval $i_{min}$, a maximum sampling interval $i_{max}$, and an "optimized" sampling interval $i_{opt}$. A sampling range of a group G is defined as:

$[i_{min}, i_{max}]$ where for each s in G, $i_{min}$=s $i_{min}$ and $i_{max}$=s.$i_{max}$ Each G also has a group sampling interval $i_g$ chosen such that $i_g = i_{min}$ and $i_g = i_{max}$.

procedure addSubscription(s)
For each sample group G,
    If the sampling range of s overlaps with the sampling range of G,
        Add s to G and update G's sampling range.
    If s not added to any group, create new group and add s to it.
    Create a telemetry request message and add "added s" to it.
    If $i_g$ of the group s was added or changed as a result,
        Add "updated $s_g$" for each s in G to the request message.
    Transmit request message to client.
procedure deleteSubscription(s)
Remove s from S and from the group G it is in.
Create a telemetry request message and add "stopped s" in it.
Recreate sampling groups. For each subscription sg in each G,
    If $s_g.i_{opt}$ changed, add "updated $s_g$" for each s in G to the request message.
    Transmit request message to client.

Next Deadline

In this process, rather than creating a "for-all-time" schedule for samplings, the client, at a given instant in time, looks at all subscriptions and finds the nearest deadline. It then sets a timer to wake itself at that time and goes to sleep. When it awakes, it samples all the subscriptions that are eligible to be sampled at that time, computes the next wake time, and goes to sleep.

When a new subscription arrives, the client can choose when to begin sampling the subscription. It chooses a sampling-begin time according to which other subscriptions the new subscription is "closest" to, using Interval Range Matching.

Condition Evaluation

Applications may wish to sample certain sensors frequently, but only be notified of their values when certain conditions occur. The TSS (110) enables condition expressions to be included in a telemetry request, using common relational and logical operators, as well as special functions that operate on sample sequences: change, percentChange, average, median, and others.

Specification

Condition expressions allow data to be sampled frequently but reported to the application only when the data meets a certain condition. A condition expression is a Boolean expression (in infix notation) composed of logical operators, relational operators, and a predefined set of functions. The grammar for the condition expression is identified as follows, wherein a notation "[ . . . ]" means zero or one occurrence; "{ . . . }" means zero or more occurrences.

| | | |
|---|---|---|
| <condition> | → | <relation> { <logical op> <relation> } |
| <relation> | → | <term> [ <relational op> <term> ] |
| <term> | → | <primary> |
| | → | ! <primary> |
| <primary> | → | <literal> |
| | → | DataName [ . DataPartName ] |
| | → | <function> |
| | → | ( < condition > ) |
| <function> | → | FunctionName ( <primary> , { <primary> } ) |
| <logical op> | → | && |
| | → | \|\| |
| <relational op> | → | == |
| | → | != |
| | → | < |
| | → | <= |
| | → | > |
| | → | >= | where
DataName: a telemetry data item name from the telemetry data dictionary.
DataPartName: a name of a telemetry data part (for composite data).
FunctionName: a function name from Table 1.

TOPAZ defines the following condition functions. A compact form of the function name is used in the postfix expression sent to clients; this appears in brackets.

Implementation

If possible, TSS clients should implement condition-expression evaluation. But not all clients will be capable of this, and there may be cases where bandwidth is cheaper than CPU cycles. Thus the TSS uses a model where clients, when they accept a telemetry subscription request, indicate in their response whether or not they will perform the condition expression evaluation. The TSS records their response in the record for the subscription. If the client chooses not to evaluate the expression, the Telemetry Receiver at the server will evaluate the condition.

Many of the condition-expression functions are "windowing" functions—they compute their value based on a fixed size history of data. Thus these functions need to maintain state. There are many possible mechanisms for this. In our embodiment a condition expression is realized as an expression tree, where each operator and function in the tree is realized as a (logically) distinct object. Each windowing-function object stores its own state.

Figure 2:
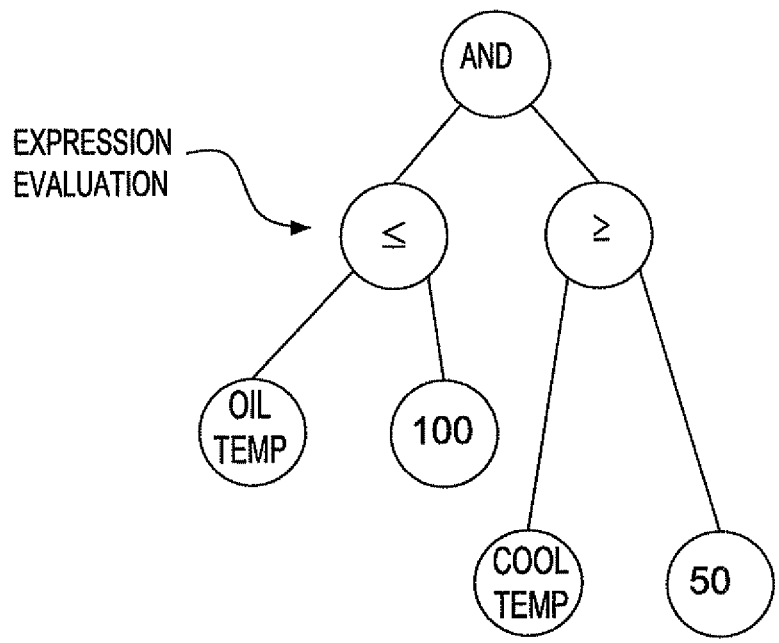
FIG. 2 is a system flow diagram depicting condition expression processing by the invention.

FIG. 2 depicts condition expression processing. When "requestTelemetry" received at server, the invention parses infix expression, validate it, and converts it to postfix form, store postfix form in subscriptions database, transmit postfix form to client. When expression received by client, the invention parses postfix form into expression evaluation tree, using classes in TOPAZ_TelemetryConditionExpression, attach expression-tree object to subscription object. When subscription data is sampled at client, the invention evaluates condition by calling "evaluate(TelemetryDataSet)" on expression tree. If result is true, send as before. When telemetry received at server, if first time, parse postfix expression into expression evaluation tree. Attach expression-tree object to cached subscription object. An expression may be stateful. But we will have multiple TelemetryReceiver nodes, which is managed with com.ibm.websphere.cache.DistributedMap. Evaluate condition by calling "evaluate(TelemetryDataSet)" on expression tree. If result is true, proceed to archiving or aggregating. Bill for data charges regardless of outcome of evaluation.

| Function | Parameters | Description |
|---|---|---|
| Change(x, n) [CH] | x: a scalar expression n: number of samples in a sliding window (must be a constant) | The change in x over the samples in the sliding window |
| percentChange(x, n) [PCH] | | The change in x over the samples in the sliding window, as a percentage relative to the first sample value |
| Average (x, n) | | The arithmetic mean of x in the sliding window |
| Median(x, n) [MED] | | The median value of x in the sliding window |
| min(x, n) [MIN] | | The minimum value of x in the sliding window |
| max(x, n) [MAX] | | The maximum value of x in the sliding window |
| countTrue(e, n) [CNT] | e: a boolean expression n: number of samples in a sliding window (must be a constant) | The number of times e is true in the sliding window. (Should we add a parameter resetOnTrue?) |
| NumTrueIn(e1,...e n) [NTR]* | e1,...e n: list of boolean expressions | The number of expressions in e1,...e n that are true |
| abs(x) | x: a scalar expression | Returns the absolute value of x |

*Because of the variable number of arguments to the numTrueIn function, it is converted to a binary form for postfix. Logically, an expression numTrueIn(e1, e2, . . . en) is first rewritten as incrTrue(e1, incrTrue(e2, . . . , incrTrue(en), 0) . . . ) where incrTrue(e, n) returns n + 1 if e is true, and n if e is false. This expression may then be converted to postfix. The postfix abbreviation for incrTrue is NTR.

Parser implementation includes that that Infix parser is generated using JavaCC, and the Postfix parser simply uses StringTokenizer and recursive descent technique. For checking if expression is valid for particular client (Because each device type can supply only a certain set of telemetry, each client version implements only a certain set of functions, and some clients may not support condition expressions at all). Validity is checked when subscription request is received. The checking enables immediate error message to application, and avoids handling these errors at condition evaluation time. What each device/client is capable of is recorded. The User/Device Resources service does this. The invention records on a per-type basis, device basis, or per-TOPAZ-client version basis. The TA may have a separate version number.

The invention provides that TelemetryReceiver should know when it needs to evaluate expression. Client capability is checked when subscription is received and processed, so the decision can be made then. The condition expression is only stored in the DB if the TR need to evaluate it. Alternatively, if recording the expression anyway, a boolean field is added to th record, or prefix the expression with something like "!".) Alternatively, the client response indicates its ability/willingness to evaluate the subscription. The invention provides evaluation exceptions at client by defining a special telemetry report that contains an error message.

Figure 3:
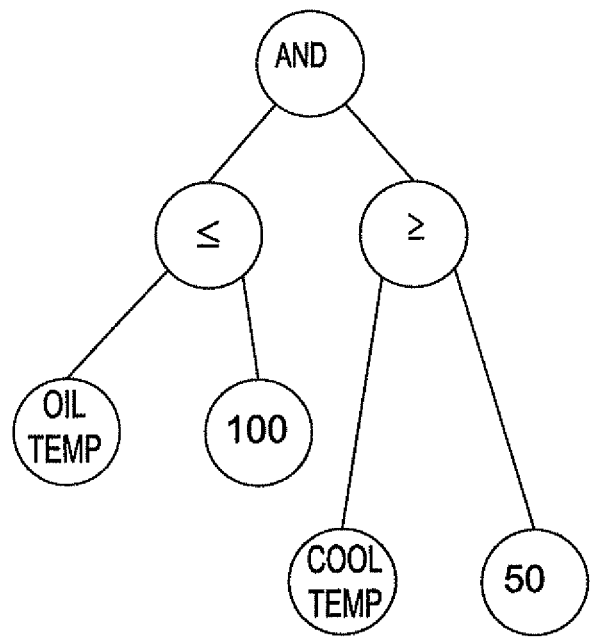
FIG. 3 is a system flow diagram depicting condition expression processing by the invention.
Figure 4:
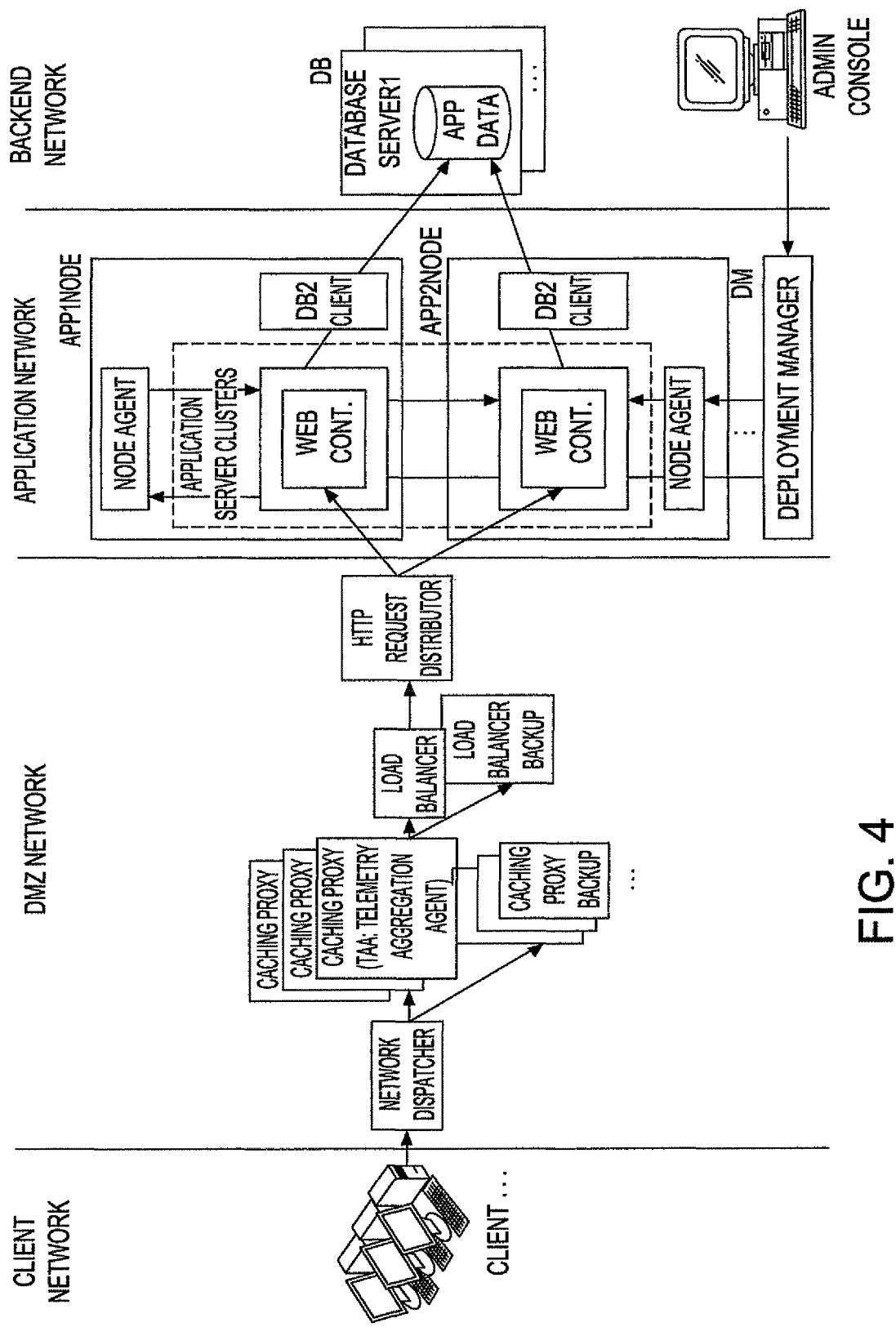
FIG. 4 is a system flow diagram describing workflow from a client network, though a DMZ network to an application network.

FIG. 3 is an evaluation expression tree. Each node implementsConditionExpressionNode interface For example, in one method, public voidevaluate(TelemetryDataSet). In addition, each implements aget<type>Result( ) method returning the appropriate type (bo o float, or int . . . need double?). More, certain nodes are stateful (those th implement the windowing functions). Therefore, logical operators should be implemented to do short-circuit evaluation. In the evaluation procedure, the invention call evaluate( ) on root node. This calls evaluate( ) on child nodes, which calls evaluate( ) on their children, etc. Each call to evaluate( ) is follow a call to get<type>Result( ) to retrieve the result of the evaluation.

Client Telemetry Aggregation

From a perspective of an individual client, each transmission of telemetry is a discrete event. For a server, which may handle telemetry streams from clients numbering in the millions, handling each telemetry transmission as a discrete event is extremely inefficient due to the overhead incurred in processing an event. The overhead involves reading data from I/O buffers, invoking the application server reading from those buffers, the application server invoking the code that is to handle the data—these are the steps at the grossest level. Thus in order to cost-effectively handle large numbers of clients, it is necessary to provide a mechanism that spreads the cost of handling telemetry from a large number of clients over a large number of events. The invention does this.

Aggregation Architecture

The Telemetry Subscription Service architecture is targeted at supporting a population of clients numbering in the millions. The architecture employs a set of loosely coupled web service nodes, each serving a subset of the client population. While individual clients transmit short event messages, there are a very large number of events in the aggregate. The architecture attempts to aggregate events into larger messages when crossing system interface boundaries. It distributes system functionality to different stages to allow the accumulation of events into aggregates that are then passed between the stages. The various stages are distributed across different node groups in the cluster to support load balancing and high availability. The cluster members are located across multiple machines supporting a horizontal scaling topology. This enables several machines to be presented as a single logical image.

There are three main stages in the current system. A telemetry aggregation stage is the initial ingress point for events from clients. From there aggregate messages are forwarded to the main TOPAZ service stage. A persistence stage is used to mediate access to the database.

Client Communications

In the TOPAZ communications model, a single client can have several telemetry streams going to the TOPAZ server. However, to simplify the system, all client communications with TOPAZ are targeted to the same TOPAZ node. For the reference implementation, clients communicate with TOPAZ using HTTP over TCP. So all of the application stream events from the client are transmitted over the same TCP connection.

Caching Proxy

The Telemetry Aggregation Agent (TAA) is the first stage and is implemented using a caching proxy. This is a WebSphere service that sits in front of a J2EE application server, whose purpose is to quickly satisfy common incoming requests. Incoming events arrive at the telemetry aggregator, are validated, and are queued to be sent to their target TOPAZ node. Aggregate requests are sent from the telemetry aggregator to the target TOPAZ node. When an aggregate response is received, the pending event responses for that request are returned to the respective clients; and any queued requests are aggregated and forwarded to the target node. There is a maximum number of aggregate requests that may be outstanding to a target node.

The TSS architecture requires that all of a given client's telemetry be directed to one TOPAZ node for long durations of a client's session of activity. This enables a Telemetry Receiver node to cache telemetry subscription records, preventing excessive accesses to the database. The burden this places upon the TAA is that it must queue client telemetry separately for each TOPAZ node receiving data from the clients served by the TAA. The TAA uses session affinity information, i.e. JSESSIONID cookies to assign a client telemetry stream to a particular TOPAZ node.

J2EE Application Server

The main TOPAZ processing is done in the second stage in a J2EE application server. TOPAZ processing involves receiving an aggregate request, retrieving any required information from the database, applying any required billing or logging for an event, applying any conditional event processing, and queuing the event to be forwarded to any subscribed applications or archived.

Persistence

Interactions with the database are confined to a third stage where similar requests can be aggregated into a single query. Updates or inserts are batched together to improve performance.

Load Balancer

The Load balancer allows load balancing for HTTP requests from the client to the cluster member among several TOPAZ cluster nodes. Session cookies are used to provide node affinity for HTTP requests from the same client node. However, since the load of these sessions can vary over time, depending on the subscriptions on a client, it is valuable to be able to move a session from one TOPAZ node to another. This is done through the database: information about the current state of a session is placed in a record when a session is moved.

TSS Data Handling and Application Telemetry Aggregation

Once data has been received by the Telemetry Receiver, it must be processed according to the parameters of the original subscription. Where necessary, the invention evaluates a condition expression, and the data is queued for transmission to an application or written to an archive. Because of the large numbers of data events received by a Telemetry Receiver when it is handling millions of clients, efficiency of object allocation becomes an important factor in the overall performance of the system. An object allocation mechanism that avoids most object allocation, and hence garbage collection, during the steady-state running of the system.

Data Object Allocation

When multiple telemetry report is written into the buffer on the server side, the libraries try to allocate large arrays of report, which eventually causes latency for the ram to become available. To prevent this, the invention does not write out the whole telemetry report into a buffer in one shot. Instead, the invention writes each report separately, and copies it into a buffer. In this way, one small byte array is allocated into the buffer and reduces the latency. The invention also makes certain that all the headers have been sent from the client to the server by sending telemetry out to the output stream. The support of chunked transfers also disables the allocation of a large internal buffer for sending requests.

Application Telemetry Aggregation

Client Telemetry Aggregation aggregates the telemetry from multiple clients regardless of the ultimate destinations of the data. Once inside the Telemetry Receiver, the data must be routed to one or more applications that have requested the data. Since, like the TSS, applications also have a certain overhead in processing a telemetry data event, it is helpful to applications to deliver telemetry to them in chunks. The purpose of telemetry aggregation is to reduce the overhead of layer transition for each event by aggregating the events into larger chunks. The invention uses the client telemetry aggregator (175) to aggregate the small event messages into larger event groups. The invention is able, therefore, to reduce the overhead of HTTP parsing and servlet setup calls within TOPAZ server. The cost of parsing HTTP and setting up a servlet call is shared by all the events in an aggregated group. There are two criterions for aggregation; time and the size of the aggregated group. Mostly, events are aggregated during a certain time window, which specifies how long the arriving events will be aggregated on the telemetry aggregator before the aggregated group of events is sent to the server. If the events are scarcely aggregated during the time period, the aggregator waits until the minimum size of events has arrived and then it sends the aggregated group of events.

Telemetry Archiving

Telemetry reports may be delivered immediately or archived and then delivered at specified intervals. This supports applications that need regular collection of data but who do not need it for real-time response. Archived data can be compressed for delivery for more efficient use of bandwidth and application-server I/O resources. For archived data, TOPAZ provides a number of functions that operate on the data-set as a whole. Functions include min, max, sum, and count, as well as statistical functions such as average and median.

Specification

The archiving period specifies regular times when TOPAZ will deliver archived telemetry to the application. The format is:

| | | |
|---|---|---|
| <archive-period> | → | <monthly> \| <weekly> \| <daily> \| <hourly> \| <by-minutes> |
| <monthly> | → | <num>M@<day-of-month> <time-of-day> |
| <weekly> | → | <num>W@<day-of-week> <time-of-day> |
| <daily> | → | <num>D@<time-of-day> |
| <hourly> | → | <num>H@<minutes-in-hour> |
| <by-minutes> | → | <num>m |
| <num> | → | the number of months/weeks/days/hours/minutes between reports. |
| <day-of-month> | → | 1 . . . 31 (In months that do not have as many days as the day-of-the-month given, the last day of the month shall be used.) |
| <day-of-week> | → | Mon \| Tue \| Wed \| Thu \| Fri \| Sat \| Sun |
| <time-of-day> | → | hh:mm (24-hour format, in the local time of the server) |
| <minutes-in-hour> | → | 0 . . . 59 |

The following examples highlight this formatting.
1M@15 00:00    Send archive each month, on the 15th of the month, at midnight.
2W@Wed 08:30    Send archive every two weeks, on Wednesday, at 8:30 AM.
1D@18:00    Send archive daily at 6 PM.
3H@30    Send archive every 3 hours, on the half-hour.
20 m    Send archive every 20 minutes.

Archiving Functions

The archiveTelemetry . . . methods allow the caller to provide a list of archiving functions, each of which they would like to be applied to the set of data reports. TOPAZ specifies the following set of functions. A platform operator may augment this set with additional functions as shown in the following table.

| Function | Description (x: telemetry data item) |
|---|---|
| max(x) | Maximum value of x in the report. |
| min(x) | Minimum value of x in the report. |
| median(x) | Median value of x in the report. |
| average(x) | Average value (mean) of x in the report. |
| sum(x) | Sum of x in the report. |
| count(x) | Number of reports of x. |

The archiving functions operate only on scalars. For telemetry data items that are multi-valued, such as pos, the caller must name the parts using a dotted notation. For example, "min(pos.lon); min(pos.lat); max(pos.lon); max(lat)" computes the bounding box of an entity's movement.

Implementation

Figure 5:
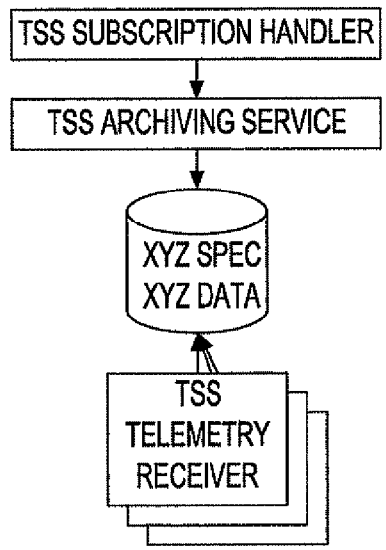
FIG. 5 is a system flow diagram depicting TSS archiving, server side.
Figure 6:
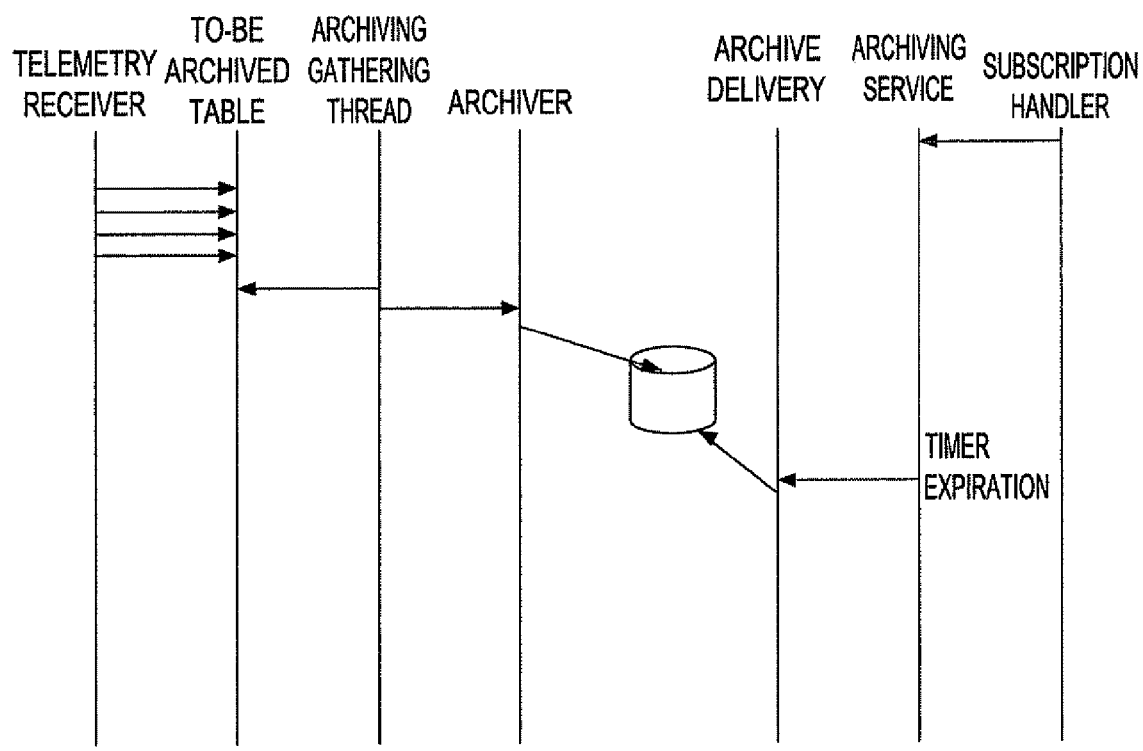
FIG. 6 depicts system protocol.

FIG. 5 depicts TSS archiving, on the server-side. That is, each TOPAZ installation has an Archiving Service application (servlet). The TSS service messages this service when an archiving subscription is received. The message contains the archiving functions and report period. The service sets up a scheduled task for delivery of the archived data. The Timer-Task gets a thread from a thread pool, gives it a ProcessTelemetryArchive Runnable, and starts it. Each TSS receiver writes telemetry data to be archived to a file shared by all TSS receiver nodes. Archived data files are in a directory named by the application stream ID. The name of the file is [clientstreamID].data. The content of the file is a series of <report> objects. Although a client stream file should be accessed by only one TSS Receiver (because a client's data should be directed to always the same receiver), the receiver will lock the file in case of access from multiple threads on the same receiver node. The archive-writing task uses the same technique as the metering process. The servlet puts the data into a data structure shared by a "gathering" thread, which writes the data to the archive file. The scheduled archive-delivery process reads the archive file, parses it into Java objects, computes the archive functions, and then sends the results to the application. FIG. 6 describes protocol.

Report Synchronization

Applications may request that telemetry reports from multiple subscribers be delivered to it in fewer, larger batches, rather than in smaller, more frequent batches. This reduces the load on the application server receiving the telemetry reports. Through the maximizeAggregation parameter, applications can request that TSS deliver telemetry for group subscriptions in as few, and as large, transmissions as possible. In the ideal case, this would result in a single transmission at each sampling interval, containing the telemetry of all active group members. Although in a real-world system involving low-performance devices, wireless networks, and network gateways this ideal will rarely be possible. TSS will attempt a reasonable approximation of it.

The invention approximates by synchronizes the sampling and transmission of telemetry data at all clients in the group. Without synchronizing the sampling of data—if data received from clients were simply buffered until the next send time—the earliest data buffered would be stale by the time it got to the application. TSS synchronizes the telemetry streams by setting the syncTime attribute in the telemetry subscriptions sent to all clients to a UTC time that it determines. The server may simply use its current time for syncTime, and let each client compute a start time by adding a multiple of maxInterval sufficient to produce a future time when it may begin sampling.

Although a few examples of the present invention have been shown and described, it would be appreciated by those skilled in the art that changes are made in these embodiments without departing from the principles and spirit of the invention, the scope of which is defined in the claims and their equivalents.

What is claimed is:

1. A telemetry data acquisition management system for interfacing with and receiving telemetry data sampled from sensor bearing systems for distribution to a plurality of data processing applications, and charging the data processing applications according to the load responding to requests placed on the system, the system comprising:
   a memory storage device;
   a programmed system processor device coupled to the memory storage device and configured to perform a method comprising:
   specifying in a subscription, a timing interval between the sampled telemetry data, said timing interval including a minimum sampling interval and a maximum sampling interval;
   creating groups of two or more subscriptions of multiple applications to the telemetry data sampled from the same sensor bearing systems, each group having a specified sampling range including a further minimum sampling and a further maximum sampling interval such that, for each group, a sampling range of each subscription of the group overlaps with all other subscriptions in the group, a created group including the two or more subscriptions;
   merging specified timing intervals of the two or more subscriptions in the group, the merged specified timing intervals defined between the further minimum sampling interval and the further maximum sampling interval, the merged timing intervals reducing the number of the sampled telemetry data in the group;
   receiving the reduced number of sampled telemetry data in the group during the merged timing intervals;
   optimizing sensor bearing entity communication;
   receiving, from a client device, in response to a telemetry subscription request, an indication that said client device chooses not to perform evaluation of data-reading conditions;
   evaluating the data-reading conditions for sensor bearing systems at a telemetry receiver if the received response from a client device indicates the client will not perform the conditions evaluation;
   receiving, at the data processing applications, only sensor reading data when the conditions are met;
   pre-compiling data reading conditions to allow for a simpler condition evaluator at the sensor bearing systems to spread reading overhead over many events; and
   evaluating whether the two or more subscriptions are periodic requests;
   buffering the received sampled telemetry data for a short time and forwarding to a corresponding requesting data processing application in a single bulk transaction, wherein said received sampled telemetry data is transmitted for all subscriptions in a group, at a same time, if the two or more subscriptions are the periodic requests;
   preventing a record associated with the two or more subscriptions from being cached and deleting the record, otherwise.

2. The telemetry data acquisition management system as set forth in claim 1, wherein the programmed system processor device creates said group by combining subscriptions of multiple applications to same data items from same entities so that load on sensor bearing systems for sensor reading is reduced, and so that load on wireless network is reduced, evaluates data-reading conditions on sensor bearing systems so that applications only receive sensor readings when the conditions have been met, reduces system load, reduces processing load on any of the plurality of data processing systems or applications receiving the sensor readings, pre-compiling to allow for a simpler condition evaluator at the entity, spreading processing overhead by processing telemetry event over many events, reducing processing load of data processing systems or applications by reading from multiple sensor bearing systems for a short period before forwarding to its associated data processing system, or application, reducing processing load of data processing systems or applications using group subscriptions.

3. The telemetry data acquisition management system as set forth in claim 1, wherein said programmed system processor device is further configured to specify, responsive to an application subscribing to receive telemetry data, an add subscription procedure.

4. The telemetry data acquisition management system as set forth in claim 3, wherein for said add subscription procedure, said programmed system processor device is further configured to perform a method comprising:
   detecting, for each sample group G, if the sampling range of a subscription S overlaps with the sampling range of G, and one of:

adding S to G, and updating G's sampling range if overlap is detected, the updating comprising: merging specified timing intervals of S and the two or more subscriptions in the sample group G; or, creating a new group and adding S to the created new group.

5. The telemetry data acquisition management system as set forth in claim 4, further comprising:

creating a telemetry request message and adding S to the created telemetry request message.

6. The telemetry data acquisition management system as set forth in claim 4, further comprising:

specifying a group sampling interval $i_g$ based on said further minimum sampling interval and said further maximum sampling interval;

detecting if S being added to G changes said $i_g$ of G as a result, and if so, updating a corresponding sampling interval for each S in G, the updated corresponding sampling interval becoming the merged specified timing intervals of S and the two or more subscriptions in G, and adding the updated corresponding sampling interval to the request prior to transmission to a client device.

7. The telemetry data acquisition management system as set forth in claim 1, wherein the sensor bearing systems and the data processing application forms a cyclic graph.

8. The telemetry data acquisition management system as set forth in claim 1, wherein said programmed system processor device is further configured to perform:

receiving a request for a one-time telemetry sampling of a client's data, or data of a group of clients, said request including a parameter specifying how old a cached data reading can be and remain acceptable to an application.

9. The telemetry data acquisition management system as set forth in claim 1, wherein said programmed system processor device is further configured to perform:

reviewing, at a client, all subscriptions to determine a nearest deadline; and setting a self timer to wake itself at a time corresponding to said deadline, and placing itself in a sleep mode; and sampling, when awake, all the subscriptions that are eligible to be sampled at that time.

10. The telemetry data acquisition management system as set forth in claim 1, wherein a data-reading condition allows data to be sampled frequently but reported to the application only when the data is evaluated to meet a certain condition, said condition expressed as a Boolean expression including relational operators and logical operators, and functions that operate on a sequence of samples.

11. The telemetry data acquisition management system as set forth in claim 1, wherein one of said expression functions is a windowing function that computes a value based on a fixed size history of data, said expression function maintaining state, said method further comprising:

realizing a condition expression as an expression tree, where each operator and function in the tree is realized as a logically distinct object with each windowing-function object storing its own state.

12. The telemetry data acquisition management system as set forth in claim 1, wherein a telemetry transmission from a client device is an event, said method further comprising:

employing one or more web service nodes, each node serving a subset of said client devices; and aggregating, at a telemetry aggregating device, individual clients event messages into larger messages by accumulating events into aggregates for passing between various processing stages, the various processing stages being distributed across different node groups in a cluster to support load balancing and high availability, wherein cluster of node members are located across multiple machines supporting a horizontal scaling topology to present several machines as a single logical image, and a criterion for said aggregating comprising: a time and the size of an aggregated group, wherein events are aggregated during a time window specifying a length of time arriving events will be aggregated on a telemetry aggregator before sending the aggregated group of events to a server; and said telemetry aggregating device waiting until a minimum size of events has arrived before sending the aggregated group of events.

13. A computer program product, the computer program product comprising:

a non-transitory tangible storage medium readable by a processing circuit and storing instructions for execution by the processing circuit for performing a method of interfacing with and receiving telemetry data sampled from sensor bearing systems for distribution to a plurality data processing applications, and charging the data processing applications according to the load responding to requests imposed, the method comprising steps of:

specifying in a subscription, a timing interval between telemetry samples, said timing interval including a minimum sampling interval and a maximum sampling interval;

creating a group of two or more subscriptions of multiple applications to the sampled telemetry data from the sensor bearing systems, a group having a specified sampling range including a further minimum sampling and a further maximum sampling interval such that, for each group, a sampling range of each subscription of the group overlaps with all other subscriptions in the group, a created group including the two or more subscriptions;

merging specified timing intervals of the two or more subscriptions in the group, the merged specified timing intervals defined between the further minimum sampling interval and the further maximum sampling interval, the merged timing intervals reducing the number of the sampled telemetry data in the group;

receiving the reduced number of sampled telemetry data in the group during the merged timing intervals;

optimizing sensor bearing entity communication;

receiving, from a client device, in response to a telemetry subscription request, an indication that said client device chooses not to perform evaluation of data-reading conditions;

evaluating the data-reading conditions for sensor bearing systems at a telemetry receiver if the received response from a client device indicates the client will not perform the conditions evaluation;

receiving, at the data processing applications, only sensor reading data when the conditions are met;

pre-compiling data reading conditions to allow for a simpler condition evaluator at the system bearing systems to spreads reading overhead over many events; and evaluating whether the two or more subscriptions are periodic requests;

buffering received telemetry data for a short time and forwarding to a corresponding requesting data processing application in a single bulk transaction, wherein said sample telemetry data is transmitted for all subscriptions in a group, at a same time, if the two or more subscriptions are the periodic requests;

preventing a record associated with the two or more subscriptions from being cached and deleting the record, otherwise.

14. The computer program product of claim 13, wherein the method comprises further steps of:
creating said group by combining subscriptions of multiple applications to same data items from same entities to reduce load on said sensor bearing systems
evaluating data-reading conditions on sensor bearing systems so that applications only receive sensor readings when the conditions have been met,
perform a pre-compiling to allow for a simpler condition evaluator at the sensor bearing entity, and
processing telemetry event over many events, thereby spreading processing overhead and reducing processing load of data processing systems or applications by reading from multiple sensor bearing systems for a short period before forwarding to its associated data processing system, or application, and reducing processing load of data processing systems or applications using said group of two or more subscriptions.

15. The computer program product of claim 13, wherein said method comprises further steps of: specifying, responsive to an application subscribing to receive telemetry data, an add subscription procedure.

16. The computer program product of claim 15, wherein for said add subscription procedure, said processing circuit is further configured to perform a method comprising:
detecting, for each sample group G, if the sampling range of a subscription S overlaps with the sampling range of G, and one of:
adding S to G, and updating G's sampling range if overlap is detected, the updating comprising: merging specified timing intervals of S and the two or more subscriptions in the sample group G; or,
creating a new group and adding S to the created new group.

17. The computer program product as set forth in claim 16, wherein said method comprises further steps of:
creating a telemetry request message and adding S to the created telemetry request message.

18. The computer program product as set forth in claim 16, wherein said method comprises further steps of:
specifying a group sampling interval $i_g$ based on said further minimum sampling interval and said further maximum sampling interval;
detecting if S being added to G changes said $i_g$ of G as a result, and if so, updating a corresponding sampling interval for each S in G, the updated corresponding sampling interval becoming the merged specified timing intervals of S and the two or more subscriptions in G, and adding the updated corresponding sampling interval to the request prior to transmission to a client device.

19. The computer program product as set forth in claim 13, wherein said processing circuit is further configured to perform a method comprising:
receiving a request for a one-time telemetry sampling of a client's data, or data of a group of clients, said request including a parameter specifying how old a cached data reading can be and remain acceptable to an application.

20. The computer program product as set forth in claim 13, wherein said programmed system processor device is further configured to perform:
reviewing, at a client, all subscriptions to determine a nearest deadline; and
setting a self timer to wake itself at a time corresponding to said deadline, and placing itself in a sleep mode; and
sampling, when awake, all the subscriptions that are eligible to be sampled at that time.

* * * * *